(12) United States Patent
Gang (10) Patent No.: US 12,338,913 B2
(45) Date of Patent: Jun. 24, 2025

(54) ELECTROMAGNETIC VALVE

(71) Applicant: Zhejiang Sanhua Climate and Appliance Controls Group Co., Ltd., Shaoxing Zhejiang (CN)

(72) Inventor: Zuan Gang, Shaoxing Zhejiang (CN)

(73) Assignee: ZHEJIANG SANHUA COMMERCIAL REFRIGERATION CONTROLS CO., LTD, Zhejiang Province (CN)

( * ) Notice: Subject to any disclaimer, the term of this patent is extended or adjusted under 35 U.S.C. 154(b) by 295 days.

(21) Appl. No.: 17/769,508

(22) PCT Filed: Aug. 20, 2020

(86) PCT No.: PCT/CN2020/110166
§ 371 (c)(1),
(2) Date: Apr. 15, 2022

(87) PCT Pub. No.: WO2021/077880
PCT Pub. Date: Apr. 29, 2021

(65) Prior Publication Data

US 2024/0133482 A1    Apr. 25, 2024
US 2024/0229966 A9    Jul. 11, 2024

(30) Foreign Application Priority Data

Oct. 22, 2019    (CN) .......................... 201911007596.7

(51) Int. Cl.
*F16K 31/40*    (2006.01)
(52) U.S. Cl.
CPC .......... *F16K 31/406* (2013.01); *F16K 31/408* (2013.01)

(58) Field of Classification Search
CPC .. F16K 31/406; F16K 31/408; F16K 31/0675; F16K 31/0689; F16K 31/0696; F02M 51/0685; F02M 63/0075
(Continued)

(56) References Cited

U.S. PATENT DOCUMENTS 6,390,444 B1 *  5/2002  Moreno .............. F16K 31/0693
                                                    251/30.01
7,163,188 B1 *  1/2007  Sisk .................... F16K 31/0689
                                                    251/284

(Continued)

FOREIGN PATENT DOCUMENTS

CN    202176805 U    3/2012
CN    103185164 A    7/2013
(Continued)

OTHER PUBLICATIONS

International Search Report dated Nov. 25, 2020 for PCT Appl. No. PCT/CN2020/110166.

*Primary Examiner* — Marina A Tietjen
(74) *Attorney, Agent, or Firm* — Ohlandt, Greeley and Perle, L.L.P.

(57) ABSTRACT

An electromagnetic valve, including a valve body, a valve sleeve, a valve element, a static iron core, a movable iron core and a first valve port portion, and further including a limiting member, a first spring and a second spring. One end of the first spring abuts against the limiting member, and the other end of the first spring abuts against the static iron core. One end of the second spring abuts against the movable iron core, and the other end of the second spring abuts against the valve element. The limiting member includes a first limiting portion, and the movable iron core includes a second limiting portion. The valve element includes a third limiting portion, and the movable iron core includes a fourth limiting portion.

16 Claims, 7 Drawing Sheets

(58) Field of Classification Search
USPC .................................................. 251/129.19
See application file for complete search history.

(56) References Cited

U.S. PATENT DOCUMENTS

| | | | | |
|---|---|---|---|---|
| 7,828,265 B2* | 11/2010 | Sisk | .................... | F16K 31/0655 |
| | | | | 251/284 |
| 2015/0028237 A1 | 1/2015 | Liu et al. | | |
| 2018/0163685 A1 | 6/2018 | Yasukawa et al. | | |
| 2019/0331076 A1* | 10/2019 | Saizen | ............... | F02M 51/0685 |
| 2021/0102520 A1* | 4/2021 | Miyamoto | ........... | F02M 61/168 |

FOREIGN PATENT DOCUMENTS

| | | | | | |
|---|---|---|---|---|---|
| CN | 203162297 U | | 8/2013 | | |
| CN | 104455650 A | | 3/2015 | | |
| CN | 206159607 U | | 5/2017 | | |
| CN | 107709751 A | | 2/2018 | | |
| CN | 102330834 A | | 1/2021 | | |
| DE | 2361398 B | * | 3/1975 | ......... | F02M 63/0022 |
| DE | 19645424 A1 | * | 12/1997 | ........... | F02M 23/006 |
| DE | 102014119592 A1 | | 8/2015 | | |
| JP | S60196481 A | | 10/1985 | | |
| JP | H09126346 A | | 5/1997 | | |
| JP | 2004286159 A | | 10/2004 | | |
| JP | 3157218 U | | 2/2010 | | |
| JP | 2018123826 A | * | 8/2018 | ............. | F02M 51/06 |
| WO | WO-2019072793 A1 | * | 4/2019 | ........... | B05B 1/3053 |
| WO | WO-2019163383 A1 | * | 8/2019 | ......... | F02M 51/0628 |

\* cited by examiner

Enlarged view of portion Q2 (coil is removed)

ELECTROMAGNETIC VALVE

This application is the national phase of International Patent Application No. PCT/CN2020/110166, titled "ELECTROMAGNETIC VALVE", filed on Aug. 20, 2020, which claims the benefit of priority to Chinese Patent Application No. 201911007596.7, titled "ELECTROMAGNETIC VALVE", filed with the China National Intellectual Property Administration on Oct. 22, 2019, both of which are incorporated herein by reference in their entireties.

FIELD

The present application relates to the technical field of fluid control, and in particular to an electromagnetic valve.

BACKGROUND

An electromagnetic valve generally includes a valve body, a valve sleeve, a valve core, a static iron core, a movable iron core and a valve port portion. The working principle of the electromagnetic valve is that, the external electromagnetic coil is energized to generate electromagnetic attraction force between the movable iron core and the static iron core, so that the movable iron core drives the valve core to move towards the static iron core to open the valve port of the valve port portion; and after the electromagnetic coil is powered off, under the action of the return spring force, the movable iron core drives the valve core to move away from the static iron core to close the valve port.

Therefore, how to improve the performance of valve opening during the valve opening process of the electromagnetic valve is a problem considered by those skilled in the art.

SUMMARY

An electromagnetic valve provided by the present application includes a valve body, a valve sleeve, a valve core, a static iron core, a movable iron core and a first valve port portion. The static iron core is fixedly connected with the valve sleeve, and the movable iron core is at least partially located in an inner cavity of the valve sleeve. The valve body includes a flow path inlet end and a flow path outlet end, and the valve core can abut against the first valve port portion. The electromagnetic valve further includes a limiting member, a first spring and a second spring. The limiting member is at least partially located in an inner cavity of the movable iron core, and the limiting member can abut against the valve core; one end of the first spring abuts against the limiting member, and the other end of the first spring abuts against the static iron core; one end of the second spring abuts against the movable iron core, and the other end of the second spring abuts against the valve core; the limiting member includes a first limiting portion, the movable iron core includes a second limiting portion capable of abutting against the first limiting portion, and the movable iron core can drive the limiting member to move toward the static iron core; the valve core includes a third limiting portion, the movable iron core includes a fourth limiting portion capable of abutting against the third limiting portion, and the movable iron core can drive the valve core to move toward the static iron core.

The electromagnetic valve provided by the present application can improve the performance of valve opening of the electromagnetic valve by setting movement restrictions between the limiting member and the movable iron core, and between the movable iron core and the valve core.

Reference numerals in FIGS. 1 to 9 are as follows:
100 main valve component;
110 valve body;
111 second valve port portion, 112 flow path inlet end, 113 flow path outlet end;
114 protruding ring/lower limiting portion;
115 upper end surface;
120 mounting seal cap;
121 outer protruding portion;
122 stepped surface of the outer protruding portion;
123 inner protruding portion/upper limiting portion;
124 stepped surface of the inner protruding portion;
130 body;
200 pilot valve component;
210 valve sleeve;
211 inner cavity of the valve sleeve;
212 lower end surface of the valve sleeve;
220 valve core;
221 third limiting portion/second outer flange portion;
222 second through hole;
223 upper end surface;
230 movable iron core;
231 inner cavity of the movable iron core;
232 core body;
233 second limiting portion/first inner flange portion;
240 nested member;
242 fourth limiting portion/second inner flange portion;
243 lower flange portion;
244 third through hole;
250 limiting member;
251 first limiting portion/first outer flange portion;
252 upper flange surface;
253 first through hole;
254 lower end surface;
260 static iron core;
270 first spring;
280 second spring;
290 electromagnetic coil;
300 piston component;
310 piston body;
311 inner step;
320 piston core;

321 sealing portion, 322 first valve port portion, 323 first flow passage;
324 outer step;
400 valve cavity;
500 pilot valve cavity.

DETAILED DESCRIPTION OF THE EMBODIMENTS

In order to make those skilled in the art better understand the technical solution of the present application, the present application will be further described in detail with reference to the drawings and specific embodiments. Apparently, the drawings in the following description show only some embodiments of the present application, and other drawings may be obtained by those skilled in the art from the drawings without any inventive work. The orientation terms, such as upper and lower, involved in this application are defined with reference to the relative positions of the components as shown in the drawings, which are only for clarity and ease of describing the technical solutions. It should be understood that the orientation terms used in this application should not limit the scope of protection of this application.

Figure 1:
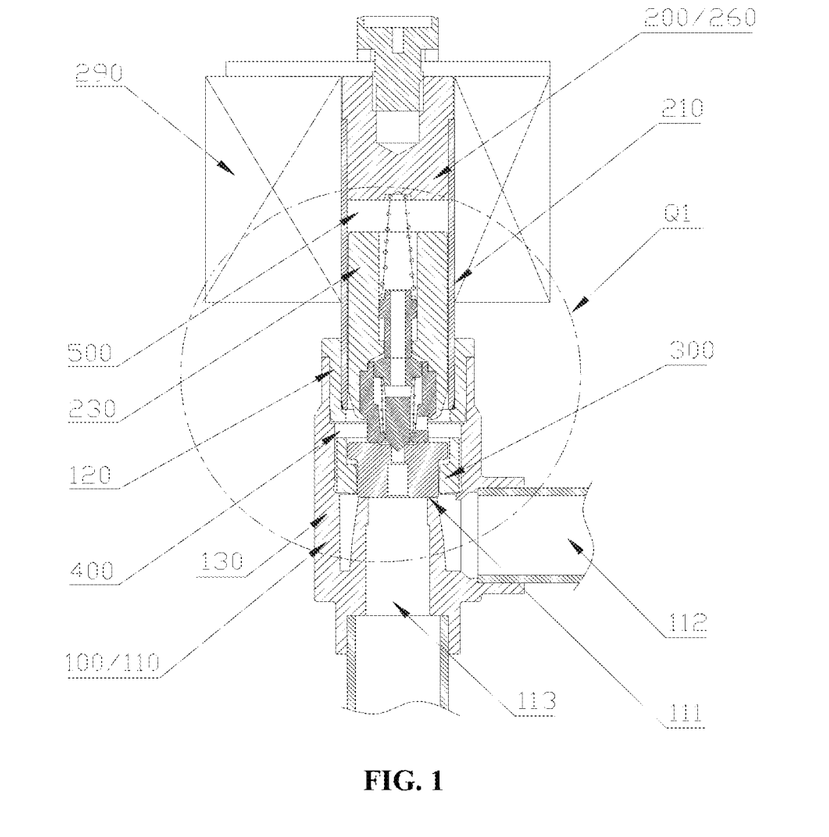
FIG. 1 is a schematic structural view of an electromagnetic valve provided by the present application in a closed state.
Figure 2:
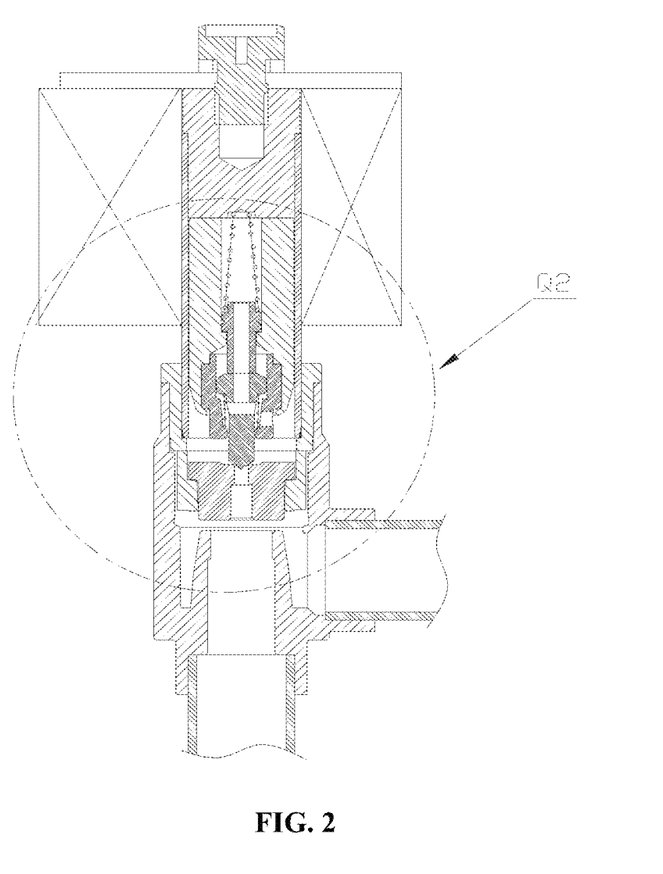
FIG. 2 is a schematic structural view of the electromagnetic valve shown in FIG. 1 in an open state.

FIG. 1 and FIG. 2 are schematic structural views of an electromagnetic valve provided by the present application, respectively in a closed state and an open state.

Reference is made to FIG. 1 and FIG. 2.

The electromagnetic valve given in this specific embodiment is a two-stage pilot electromagnetic valve structure, including a main valve component 100, a pilot valve component 200 and a piston component 300.

The main valve component 100 includes a valve body 110. The valve body 110 includes a body 130 and a mounting seal cap 120. The mounting seal cap 120 is fixedly connected to the body 130 by means of threads or welding. The lateral wall portion and the axial bottom portion of the body 130 are respectively welded with connecting pipes which can be used as a flow path inlet end 112 and a flow path outlet end 113. The main valve component 100 further includes a valve cavity 400. The flow path inlet end 112 is in direct communication with the valve cavity 400, and the flow path outlet end 113 can communicate with the valve cavity 400 through the valve port of a second valve port portion 111.

The piston component 300 is disposed in the valve cavity 400 and can slide axially in the valve cavity 400.

The pilot valve component 200 includes a valve sleeve 210, a static iron core 260 and a movable iron core 230. The valve sleeve 210 is welded with the mounting seal cap 120, and the static iron core 260 is welded and fixed to the valve sleeve 210 and seals the valve sleeve 210, so that a pilot valve cavity 500 is formed in an inner cavity 211 of the valve sleeve 210, and the pilot valve cavity 500 is communicated with the valve cavity 400.

The movable iron core 230 is arranged in the pilot valve cavity 500 (the inner cavity 211 of the valve sleeve 210), and can slide axially in the pilot valve cavity 500. An electromagnetic coil 290 is sleeved outside the valve sleeve 210.

Figure 3:
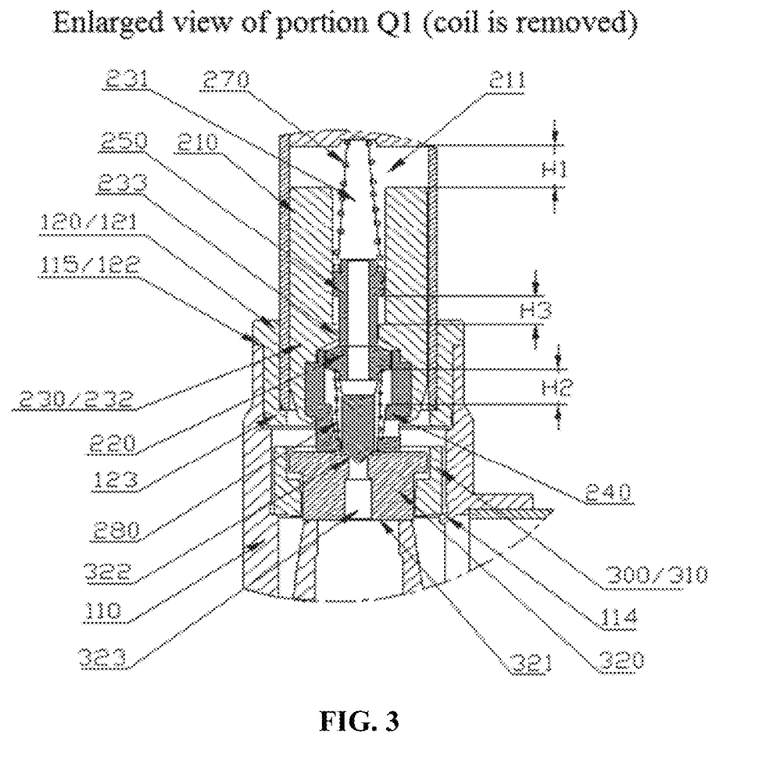
FIG. 3 is a partially enlarged view of FIG. 1.
Figure 4:
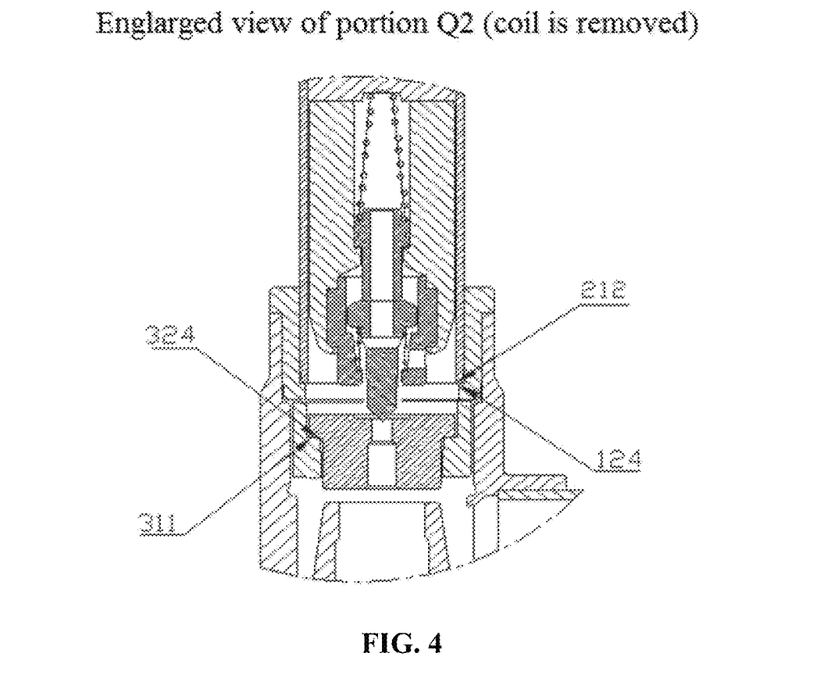
FIG. 4 is a partially enlarged view of FIG. 2.
Figure 5:
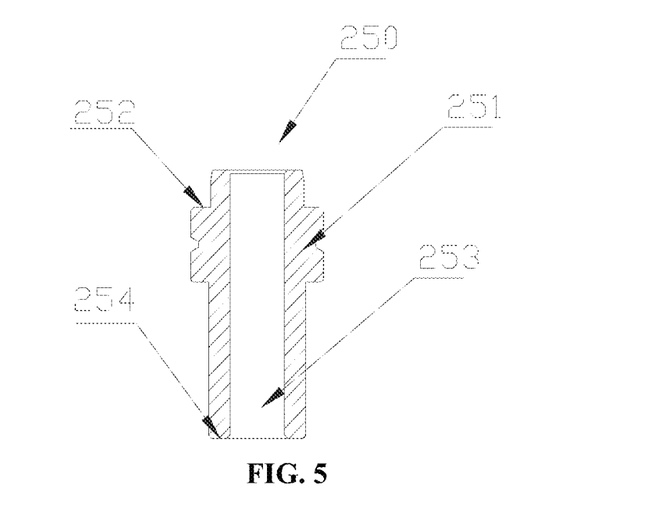
FIG. 5 is a schematic structural view of a limiting member in FIG. 1.
Figure 6:
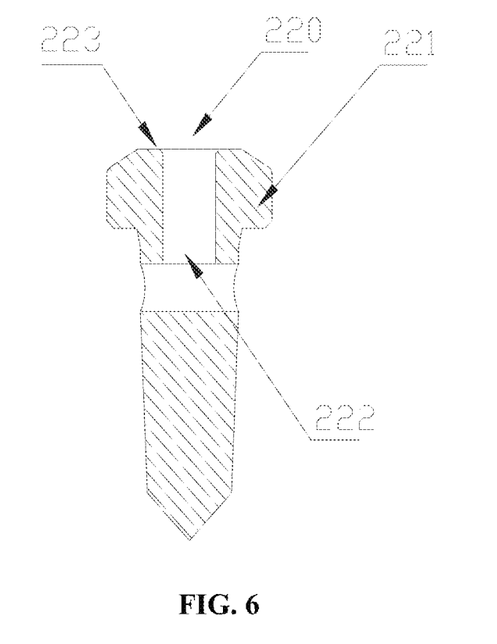
FIG. 6 is a schematic structural view of a valve core in FIG. 1.
Figure 7:
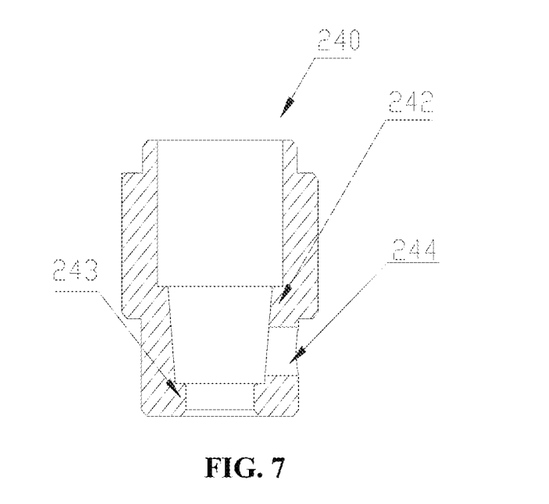
FIG. 7 is a schematic structural view of a nested member in FIG. 1.

FIG. 3 is a partially enlarged view of FIG. 1, FIG. 4 is a partially enlarged view of FIG. 2; FIG. 5 is a schematic structural view of a limiting member; FIG. 6 is a schematic structural view of a valve core; and FIG. 7 is a schematic structural view of a nested member.

Reference is made to FIG. 3, FIG. 4, FIG. 5, FIG. 6 and FIG. 7.

In this embodiment, the movable iron core 230 includes a core body 232 and a nested member 240. The nested member 240 is substantially cylindrical, and is nested in an inner hole at a lower end of the core body 232 and fixedly connected with the core body 232. The advantage of this design is that: the core body 232 can be made of soft magnetic materials, and the nested member 240 is relatively complex in shape, and can be made of common materials that are easy to process, which improves the manufacturability of parts and saves the material cost, and will not be further explained herein.

The valve core 220 is partially arranged in an inner cavity 231 of the movable iron core, and a limiting member 250 is arranged in the inner cavity 231 of the movable iron core. The limiting member 250 can slide in the inner cavity 231 of the movable iron core, and abut against the valve core 220.

The limiting member 250 is substantially cylindrical, and includes a first through hole 253 penetrating from top to bottom. An outer edge portion of the limiting member 250 is provided with a first outer flange portion as a first limiting portion 251. The outer wall surface of the first outer flange portion 251 is in sliding fit with the inner wall surface of the core body 232. The core body 232 further includes a first inner flange portion as a second limiting portion 233. Through the cooperation of the first limiting portion 251 and the second limiting portion 233, the movable iron core 230 may drive the limiting member 250 to move toward the static iron core 260.

One end of a first spring 270 abuts against an upper flange surface 252 of the first outer flange portion 251, and the other end of the first spring 270 abuts against the static iron core 260.

The valve core 220 is substantially in the shape of a thin rod, and includes a first through hole 222 penetrating through an upper end portion and an outer edge portion of the valve core 220. The outer edge portion of the valve core 220 is provided with a second outer flange portion as a third limiting portion 221. The outer wall surface of the second outer flange portion 221 is in sliding fit with the inner wall surface of the nested member 240. The nested member 240 further includes a second inner flange portion as a fourth limiting portion 242. Through the cooperation of the third limiting portion 221 and the fourth limiting portion 242, the movable iron core 230 may drive the valve core 220 to move toward the static iron core 260.

The nested member 240 includes a third through hole 244 that communicates the inner cavity 231 of the movable iron core with the valve cavity 400 below the piston component 300. The nested member 240 further includes a lower flange portion 243. One end of the second spring 280 abuts against a stepped surface of the lower flange portion 243, and the other end of the second spring 280 abuts against a lower end surface of the second outer flange portion 221 of the valve core 220.

The piston component 300 includes a piston body 310 and a piston core 320, the piston core 320 is nested in the piston body 310, and the piston body 310 is slidable with reference to the piston core 320.

A lower portion of the piston body 310 includes an inner step 311, and an upper portion of the piston core 320 includes an outer step 324. The inner step 311 cooperates with the outer step 324, so that the piston body 310 can drive the piston core 320 to move toward the movable iron core 230.

A lower end of the piston core 320 serves as a sealing portion 321, and the sealing portion 321 is adapted to the second valve port portion 111. A central through hole of the piston core 320 serves as a first flow passage, and the central through hole extends to the upper end surface of the piston core 320 to form the valve port of the first valve port portion 322. The valve core 220 is adapted to the first valve port portion 322.

The mounting seal cap 120 is substantially cylindrical, and includes an outer protruding portion 121 at an upper end and an inner protruding portion 123 at a lower end. A stepped surface 122 of the outer protruding portion 121 cooperates with an upper end surface 115 of the body 130 to form a welding surface. A stepped surface 124 of the inner protruding portion 123 abuts against a lower end surface 212 of the valve sleeve 210 to form a welding surface.

The inner protruding portion 123 as an upper limiting portion cooperates with the piston body 310, and can limit a stroke of the piston body 310 moving toward the movable iron core 230. The body 130 further includes a protruding ring 114 protruding toward the valve cavity 400. The protruding ring 114 as a lower limiting portion cooperates with the piston body 310, and can limit a stroke of the piston body 310 moving toward the second valve port portion 111.

Figure 8:
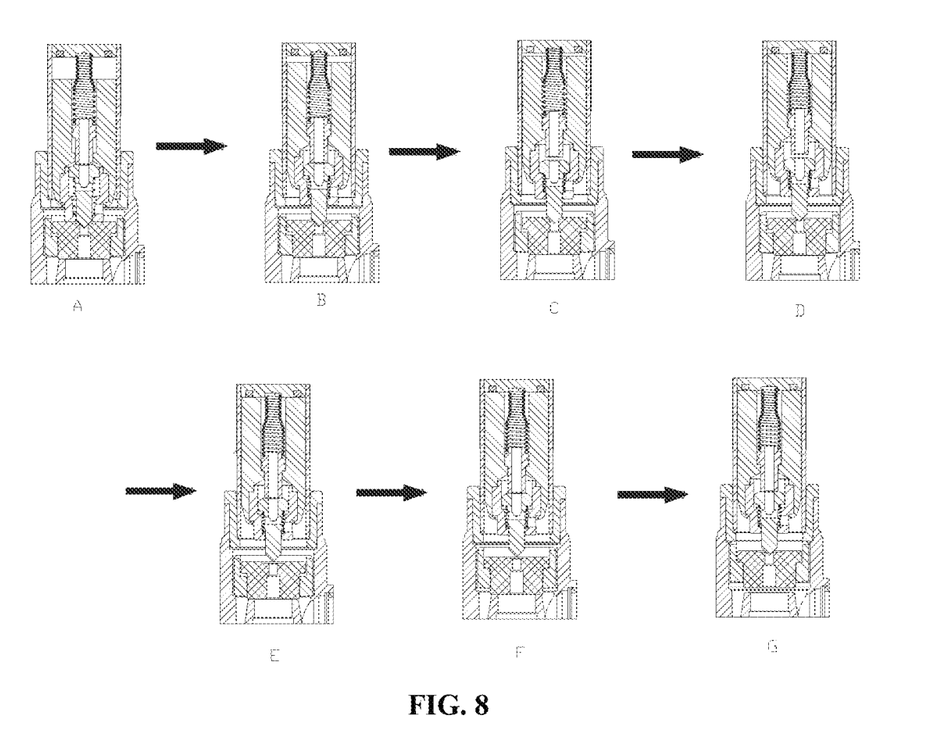
FIG. 8 is a schematic view of the action relationship of the components of the embodiment of the electromagnetic valve in the valve opening process.

FIG. 8 is a schematic view of the action relationship of the components of the embodiment of the electromagnetic valve in the valve opening process.

Reference is made to FIG. 8, further referring to FIG. 1 and FIG. 2. In this figure, the valve opening process is carried out in six stages from state A to state G, which are detailed as follows:

1. State A:

The electromagnetic coil 290 is not energized, and under the force of the first spring 270, the limiting member 250 abuts against the valve core 220, and the valve core 220 abuts against the piston core 320 and closes the first valve port 322; at the same time, the movable iron core 230 is forced to abut against the piston core 320, and the piston core 320 abuts against the second valve port portion 111. The electromagnetic valve is closed.

In state A, the first limiting portion 251 of the limiting member 250 is axially separated from the second limiting portion 233 of the movable iron core 230; the third limiting portion 221 of the valve core 220 is separated from the fourth limiting portion 242 of the movable iron core 230; the piston body 310 of the piston component 300 is axially separated from the piston core 320; and the piston body 310 of the piston component 300 is separated from the upper limiting portion 123 of the mounting seal cap 120. In state A, an axial minimum distance between the movable iron core 230 and the static iron core 260 is defined as H1, an axial minimum distance between the third limiting portion 221 and the fourth limiting portion 242 is defined as H2, and an axial minimum distance between the first limiting portion 251 and the second limiting portion 233 is defined as H3. Then H1, H2 and H3 satisfy the following: H1 is greater than H2, and H2 is greater than or equal to H3 (i.e., H1>H2, and H2≥H3).

2. Process from State A to State B:

The electromagnetic coil 290 is energized, and under the action of the electromagnetic field force, the movable iron core 230 overcomes the force of the second spring 280 and moves upward away from the piston core 320 until the first limiting portion 251 axially abuts against the second limiting portion 233. At this stage, the movable iron core only needs to overcome a small resistance of the second spring 280, so the performance of valve opening is improved. Since H1>H2 and H2≥H3, the movable iron core 230 does not abut against the static iron core 260 in state B.

3. Process from State B to State C:

The movable iron core 230 drives the first limiting portion 251 to move upward, until the third limiting portion 221 abuts against the fourth limiting portion 242 (the movable iron core 230 has not abutted against the static iron core 260 yet).

In state C, the valve core 220 does not move because the downward valve closing force of the fluid received by the valve core 220 is greater than the upward valve opening force exerted by the second spring 280.

4. Process from State C to State D:

The movable iron core 230 overcomes the force of the first spring 270 to drive the first limiting portion 252 to move further upward, and at the same time, the movable iron core 230 drives the valve core 220 to move upward away from the first valve port portion 322, until the movable iron core 220 abuts against the static iron core 260.

In this process, since the distance between the movable iron core 230 and the static iron core 260 is small, and the attraction force is large, the valve port of the first valve port portion 322 is easy to open smoothly, which improves the performance of valve opening.

5. Process from State D to State E:

The movable iron core 230 stops moving upward after abutting against the static iron core 260. After the valve is opened, the downward force of the fluid received by the valve core 220 is eliminated, and under the action of the second spring 280, the valve core 220 moves further upward until abutting against the second limiting portion 233.

6. Process from State E to State F:

The pilot valve is opened, and the high pressure medium in the inner cavity 231 of the movable iron core in the valve cavity 400 flows to the flow path outlet end 113 through the first flow passage 323. Above the piston body 310 is a medium pressure area, and below is a high pressure area, so the piston body 310 moves upward under the action of the upper-lower pressure difference until abutting against the piston core 320.

7. Process from State F to State G:

The piston body 310 moves further upward. Above the piston core 320 is a medium pressure area, and below is a low pressure area, so the piston core 320 is subjected to a downward force and keeps abutting against the piston body 310 until the piston body 310 abuts against the upper limiting portion 123.

During the valve opening process of the above-mentioned valve, the relative axial distance between the movable iron core 230 and the static iron core 260 is relatively large in the first stage when the valve is just started, and the attraction force is relatively weak. In the subsequent second stage, the relative axial distance between the movable iron core 230 and the static iron core 260 is relatively small, and the attraction force is relatively strong. Correspondingly, in the given technical solution, in the first stage, the movable iron core 230 only needs to overcome the small force of the second spring 280 to move upward, and in the second stage, the movable iron core 230 overcomes the force of the first spring 270 to drive the valve core 220 to open the valve port. Therefore, under the condition that the power of the coil remains unchanged, this solution can optimize the design and improve the performance of valve opening.

The valve closing process of the electromagnetic valve is just the opposite, that is, the process from state G to state A, which will not be repeated here.

Further, another advantage of the present application is that, in the valve closing process, the movable iron core 230 first abuts against the outer edge portion of the first valve port portion 322, and bears most of the moving impact force, so that the impact between the inner periphery of the first valve port portion 322 and the valve core 220 is relatively reduced, and the service life of the piston core 320 and the valve port portion is prolonged.

Further, another advantage of the present application is that, since the limiting member 250 abuts against the static iron core 260 through the first spring 270, and the movable iron core 230 abuts against the valve core 220 through the second spring 280, the valve core 220 and the limiting member 250 are subjected to the action of spring force in the axial direction, and they are not easy to displace and shake in the radial direction. Therefore, the electromagnetic valve with the above structure can be mounted in a non-vertical direction (the axis of movement of the valve core 220 is not necessarily required to be in the vertical direction), which will not cause the valve core 220 or the limiting member 250 to shake, will not damage the valve port, and expands the installation environment of the electromagnetic valve.

Figure 9:
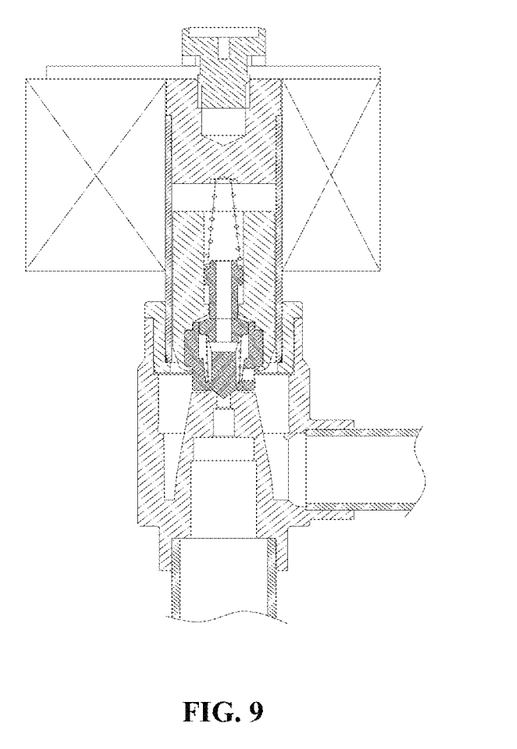
FIG. 9 is a schematic structural view of another electromagnetic valve provided by the present application in the closed state.

FIG. 9 is a schematic structural view of another electromagnetic valve provided by the present application in the closed state.

As shown in FIG. 9, the difference from the previous technical solution is that, as a direct-acting electromagnetic valve, the electromagnetic valve in this embodiment does not have the piston component, but can also achieve the beneficial effects of the aforementioned solution, which will not be repeated here.

The above embodiments are only preferred embodiments of the present application. It should be noted that, for those skilled in the art, other improvements and modifications may be further made without departing from the principle of the present application, and these improvements and modifications should also be deemed as falling into the protection scope of the present application.

The invention claimed is:

1. An electromagnetic valve, comprising a valve body, a valve sleeve, a valve core, a static iron core, a movable iron core and a first valve port portion, wherein the static iron core is fixedly connected with the valve sleeve, and the movable iron core is at least partially located in an inner cavity of the valve sleeve; the valve body comprises a flow path inlet end and a flow path outlet end, and the valve core is configured to abut against the first valve port portion; wherein the electromagnetic valve further comprises a limiting member, a first spring and a second spring,
the limiting member is at least partially located in an inner cavity of the movable iron core, and the limiting member is configured to abut against the valve core; one end of the first spring is abutted against the limiting member, and another end of the first spring is abutted against the static iron core; one end of the second spring is abutted against the movable iron core, and another end of the second spring is abutted against the valve core;
the limiting member comprises a first limiting portion, the movable iron core comprises a second limiting portion configured to abut against the first limiting portion, and the movable iron core is configured to drive the limiting member to move toward the static iron core;
the valve core comprises a third limiting portion, the movable iron core comprises a fourth limiting portion configured to abut against the third limiting portion, and the movable iron core is configured to drive the valve core to move toward the static iron core.

2. The electromagnetic valve according to claim 1, wherein the limiting member is cylindrical and comprises a first outer flange portion, the first outer flange portion serves as the first limiting portion, the movable iron core comprises a first inner flange portion, the first inner flange portion serves as the second limiting portion, and the first spring is abutted against the first outer flange portion.

3. The electromagnetic valve according to claim 2, wherein when the electromagnetic valve is closed, an axial minimum distance between the movable iron core and the static iron core is defined as H1, an axial minimum distance between the third limiting portion and the fourth limiting portion is defined as H2, and an axial minimum distance between the first limiting portion and the second limiting portion is defined as H3, and, H1, H2 and H3 satisfy the following: H1 is greater than H2, and H2 is greater than or equal to H3.

4. The electromagnetic valve according to claim 2, wherein the valve body further comprises a second valve port portion,
the electromagnetic valve comprises a piston component; the piston component comprises a sealing portion, a first flow passage and the first valve port portion; the piston component is disposed in a valve cavity of the electromagnetic valve, the sealing portion is configured to abut against the second valve port portion, and the first flow passage is configured to communicate a valve port of the first valve port portion with a valve port of the second valve port portion.

5. The electromagnetic valve according to claim 1, wherein the valve core comprises a second outer flange portion, the second outer flange portion serves as the third limiting portion, the movable iron core comprises a second inner flange portion, the second inner flange portion serves as the fourth limiting portion, and the second spring is abutted against the second outer flange portion.

6. The electromagnetic valve according to claim 5, wherein the movable iron core comprises a core body and a nested member, the core body is fixedly connected with the nested member, the nested member is cylindrical, the nested member comprises a lower flange portion, and the second spring is abutted against the lower flange portion.

7. The electromagnetic valve according to claim 6, wherein when the electromagnetic valve is closed, an axial minimum distance between the movable iron core and the static iron core is defined as H1, an axial minimum distance between the third limiting portion and the fourth limiting portion is defined as H2, and an axial minimum distance between the first limiting portion and the second limiting portion is defined as H3, and, H1, H2 and H3 satisfy the following: H1 is greater than H2, and H2 is greater than or equal to H3.

8. The electromagnetic valve according to claim 6, wherein the valve body further comprises a second valve port portion,
the electromagnetic valve comprises a piston component; the piston component comprises a sealing portion, a first flow passage and the first valve port portion; the piston component is disposed in a valve cavity of the electromagnetic valve, the sealing portion is configured to abut against the second valve port portion, and the first flow passage is configured to communicate a valve port of the first valve port portion with a valve port of the second valve port portion.

9. The electromagnetic valve according to claim 5, wherein when the electromagnetic valve is closed, an axial minimum distance between the movable iron core and the static iron core is defined as H1, an axial minimum distance between the third limiting portion and the fourth limiting portion is defined as H2, and an axial minimum distance between the first limiting portion and the second limiting portion is defined as H3, and, H1, H2 and H3 satisfy the following: H1 is greater than H2, and H2 is greater than or equal to H3.

10. The electromagnetic valve according to claim 5, wherein the valve body further comprises a second valve port portion,
the electromagnetic valve comprises a piston component; the piston component comprises a sealing portion, a first flow passage and the first valve port portion; the piston component is disposed in a valve cavity of the electromagnetic valve, the sealing portion is configured to abut against the second valve port portion, and the first flow passage is configured to communicate a valve port of the first valve port portion with a valve port of the second valve port portion.

11. The electromagnetic valve according to claim 1, wherein when the electromagnetic valve is closed, an axial minimum distance between the movable iron core and the static iron core is defined as H1, an axial minimum distance between the third limiting portion and the fourth limiting portion is defined as H2, and an axial minimum distance between the first limiting portion and the second limiting portion is defined as H3, and, H1, H2 and H3 satisfy the following: H1 is greater than H2, and H2 is greater than or equal to H3.

12. The electromagnetic valve according to claim 11, wherein a stiffness of the first spring is greater than a stiffness of the second spring, and when the electromagnetic valve is opened, the limiting member is abutted against the valve core, and the valve core is not abutted against the first valve port portion; and when the electromagnetic valve is closed, the limiting member is abutted against the valve core, and the valve core is abutted against the first valve port portion.

13. The electromagnetic valve according to claim 1, wherein the valve body further comprises a second valve port portion,
the electromagnetic valve comprises a piston component; the piston component comprises a sealing portion, a first flow passage and the first valve port portion; the piston component is disposed in a valve cavity of the electromagnetic valve, the sealing portion is configured to abut against the second valve port portion, and the first flow passage is configured to communicate a valve port of the first valve port portion with a valve port of the second valve port portion.

14. The electromagnetic valve according to claim 13, wherein the piston component comprises a piston body and a piston core, and the piston body is configured to drive the piston core to move toward the movable iron core; the valve body further comprises an upper limiting portion and a lower limiting portion, wherein the upper limiting portion is configured to limit a stroke of the piston body moving toward the movable iron core, and the lower limiting portion is configured to limit a stroke of the piston body moving toward the second valve port portion.

15. The electromagnetic valve according to claim 14, wherein the valve body comprises a body and a mounting seal cap, the mounting seal cap is fixedly connected to the body, the valve sleeve is fixedly connected to the mounting seal cap, and the mounting seal cap comprises the upper limiting portion.

16. The electromagnetic valve according to claim 15, wherein the mounting seal cap is cylindrical, an upper end portion of the mounting seal cap comprises an outer protruding portion, a lower end portion of the mounting seal cap comprises an inner protruding portion, the inner protruding portion serves as the upper limiting portion, an end surface of the outer protruding portion is abutted against an upper end surface of the body to form a welding surface, and a lower end of the valve sleeve is abutted against the inner protruding portion.

\* \* \* \* \*